March 11, 1952 H. F. MELTSNER 2,589,110
FLUSH TANK BALL VALVE
Filed Aug. 27, 1948
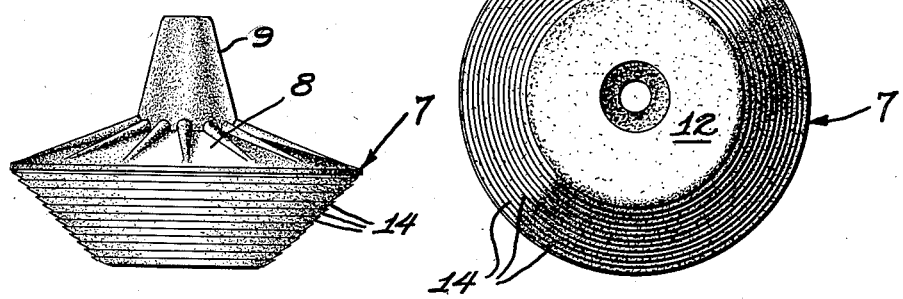
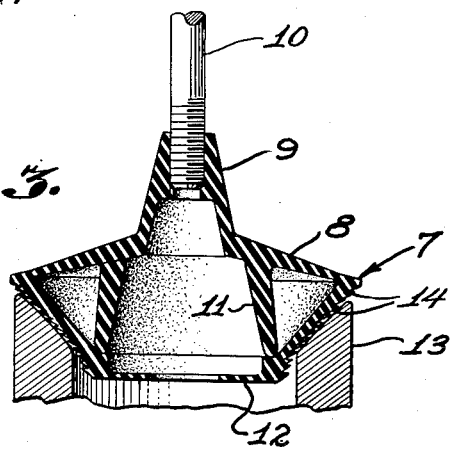
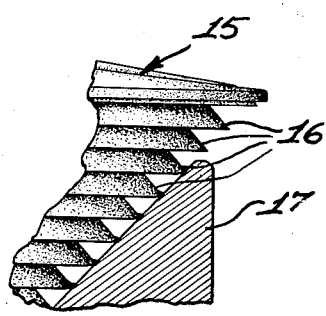
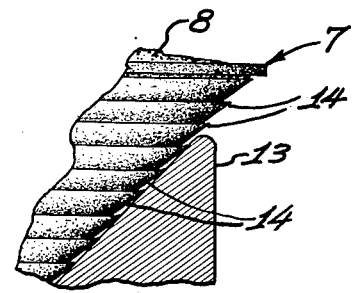
INVENTOR.
HARRY F. MELTSNER
BY
ATTORNEY Patented Mar. 11, 1952

2,589,110

UNITED STATES PATENT OFFICE 2,589,110

FLUSH TANK BALL VALVE

Harry F. Meltsner, Charlotte, N. C., assignor to Radiator Specialty Company, a corporation of North Carolina Application August 27, 1948, Serial No. 46,477

4 Claims. (Cl. 4—56)

This invention relates to ball valves for the flush tanks of toilets.

In this art the seats for the ball valves are subject to corrosion and deposits of lime or other encrustations which impair the seating surfaces thereof to an extent causing the flexible rubber or synthetic rubber ball valves to seat improperly with resultant objectionable leakage. While these ball valves are quite flexible and will readily accommodate themselves to slight irregularities of the seats and thus prevent leakage, no ball valve heretofore available, in so far as I am aware, has a seating surface which will provide a leak-proof seating on a seat which has become appreciably irregular due to corrosion or encrustations deposited thereon or due to both such causes.

In consideration of the failure of ball valves to seat properly on irregular or impaired seats, it is a main purpose of this invention to provide a ball valve having an especially constructed seating surface which will assure a leak-proof seating thereof on a valve seat which is encrusted with deposits or corroded to such an extent as to prevent proper seating of ball valves as heretofore available.

Further it is a purpose of this invention to provide a ball valve which is formed with series of closely spaced, circumferential and highly flexible flanges, fins or ribs integral with the body of the valve and of such shape and arrangement that each will provide a highly flexible seating portion subject to a more effective conformation to an irregular and impaired valve seat than possible with planar and smooth surfaces as heretofore afforded by ball valves.

Another advantage of this ribbed construction is that by reason of the plurality of such ribs in closely spaced relation, the majority thereof will seat properly to assure the prevention of leakage and each rib is urged by pressure of the water into close and proper seating position so that should one fail to seat properly one or more of the other ribs or flanges beneath an improperly seated rib or flange will assure prevention of leakage.

Another provision of this invention is that of forming the ribs or flanges of such cross sectional shape and angular disposition that each is subject to individual yielding responsive to water pressure directed from above and the resultant movement of the rib or flange is in a direction toward the valve seat, thereby assuring proper seating of the ribs.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of a ball valve embodying the present invention,

Fig. 2 is a top plan view thereof,

Fig. 3 is a vertical sectional view of the valve and its seat with valve in seated position, Fig. 4 is an enlarged fragmentary side elevation of the valve as seating with the seat shown in section, Fig. 5 is a fragmentary side elevation of a modified form of this invention, showing the valve seated and a part of the valve in section, and Fig. 6 is an enlarged fragmentary vertical sectional view of the valve shown in Figs. 1 to 4.

As shown in the accompanying drawing the present invention is embodied in a flexible rubber or flexible synthetic rubber ball valve which is formed of a hollow and generally frusto-conical body portion 7 forming a circumferential seating surface and having an integral and convex upper wall 8 carrying a boss 9 for connection with the usual stem 10. If desired, the valve as here shown may be provided with a circular reinforcing skirt 11 formed integral with and depending from the inner side of the upper wall 8 with its lower end adapted to contact the inner side of the frusto-conical portion of the body of the valve above the integral and centrally apertured bottom wall 12, to prevent collapse of the valve beyond the formation shown in Fig. 3 so as to assure proper seating of the valve on the valve seat 13.

It should be noted that my invention, which will now be described, may be embodied in ball valves without the skirt and in various forms of ball valves, provided such valves have a seating area which will accommodate the structure or formation of the present invention. Thus, in carrying out my invention, as here shown, the annular outer surface of the frusto-conical body portion 7, that is, the circumferential and downwardly tapering seating surface, is formed with a plurality of closely spaced, circumferential and integral ribs, fins or flanges 14 which project outwardly so that their outer edges are disposed for contact with the seat 13 as particularly shown in Figs. 4 and 5.

It should be noted that the ribs or fins 14 taper from their base portions which are relatively narrow toward their free outer margins which are sharp and of acute angled cross section and therefore are quite flexible so that they will readily accommodate themselves to irregularities which may be present in the valve seat due to corrosion and deposits or accumulations of lime or other encrustation.

As the plurality of the thin and highly flexible ribs or fins 14 are narrow and closely spaced, a multiplicity of the ribs constituting the majority thereof will effect a seating on the valve seat as shown in Fig. 3. If one of the ribs or fins of the majority fails to seat properly it is apparent that one or more of the seated fins below the one improperly seated one will effect a proper seating and therefore prevent objectionable leakage that would otherwise occur. Moreover, as the ribs taper to comparatively thin outer margins, these marginal portions are much more flexible than the remainder of the fins and respond readily to any hydrostatic pressure they are subjected to so that they become pressure seated against the valve seat and are thus forcibly urged and held in such contact with the seat that if the latter has an irregular seating surface the ribs will closely conform thereto in a substantially, if not entirely, leak-proof seating thereon.

I have found that if the ribs or fins 14 are inclined upwardly from the body portion 7, as best shown in Figs. 3, 4 and 6, the pressure of the water in the tank causes the fins to move in a direction towards the seat and forcibly holds the ribs in close conformation to the seat regardless of irregularities which may be present in the seating surface of the valve seat. Tests have established that the ribs or fins 14 when formed to extend angularly outwardly and upwardly at substantially the angle shown in Figs. 1 to 4 and 6 will prove more effective to prevent leakage than other types of ribs, fins or the like, yet it should be understood that this invention embraces not only this use of the closely spaced and upwardly inclined ribs or fins, but the use of any thin and flexible ribs or fins which in closely spaced relation constitute individual seating elements throughout the part of the area of the ball valve which is adapted to have seated engagement with a valve seat.

Fig. 5 shows a modified form of the invention wherein the ball valve body 15 is provided with thin and closely spaced integral fins or ribs 16 on the seating area thereof for contact with a valve seat 17 and said ribs are of similar cross section and size as the ribs 14 but are oppositely tapered or in other words extend more or less directly laterally outward for contact with the seat. Each of these ribs like the ribs 14, will be pressure-urged in a direction effective of a firm and close contact with the seat to assure a leak-proof seating of the valve.

It will now be apparent that by the simple expedient of providing ribbed seating surfaces on tank ball valves as here shown and described, I have provided a greatly improved valve which will assure a leak-proof seating on worn, irregular or otherwise impaired valve seats.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a tank ball valve, a flexible body portion having a circumferential surface adapted to be brought into opposition to a valve seat, and a plurality of flexible circumferential ribs formed on said surface for individual seating on the valve seat, said ribs being closely spaced from one another, tapered toward their outer margins and upwardly inclined and having their outer margins of acute angled cross section.

2. In a tank ball valve, a substantially frusto-conical body portion having a downwardly tapering circumferential surface adapted to be brought into substantial opposition to a valve seat for the ball valve, and a plurality of relatively thin and flexible circumferential ribs formed on said surface and projecting outwardly therefrom for seating contact with said valve seat.

3. In a tank ball valve, a substantially frusto-conical body portion having a downwardly tapering circumferential surface adapted to be brought into substantial opposition to a valve seat for the ball valve, and a plurality of relatively thin and flexible circumferential ribs formed on said surface and projecting outwardly therefrom for seating contact with said valve seat, said ribs being of equal outward extent and tapered toward their outer margins.

4. In a tank ball valve, a substantially frusto-conical body portion having a downwardly tapering circumferential surface adapted to be brought into substantial opposition to a valve seat for the ball valve, and a plurality of relatively thin and flexible circumferential ribs formed on said surface and projecting outwardly therefrom for seating contact with said valve seat, said ribs being closely spaced axially of the valve body portion and extending angularly upwardly therefrom.

HARRY F. MELTSNER.

REFERENCES CITED

The following references are of record in the file of this patent:

UNITED STATES PATENTS

| Number | Name | Date |
|---|---|---|
| 1,688,876 | Palmer | Oct. 23, 1928 |
| 1,812,388 | Walker | June 30, 1931 |
| 2,155,902 | Kass | Apr. 25, 1939 |